(12) United States Patent
Oberheide et al.

(10) Patent No.: US 8,033,055 B2
(45) Date of Patent: Oct. 11, 2011

(54) LINEAR MECHANISM FOR CLOSURE PANELS

(75) Inventors: G. Clarke Oberheide, Troy, MI (US);
Paul F. Couture, Mt. Morris, MI (US);
Gregory A. Jorgensen, Oxford, MI (US)

(73) Assignee: Magna Closures Inc., Newmarket (CA)

( * ) Notice: Subject to any disclaimer, the term of this patent is extended or adjusted under 35 U.S.C. 154(b) by 572 days.

(21) Appl. No.: 12/051,266

(22) Filed: Mar. 19, 2008

(65) Prior Publication Data

US 2008/0155900 A1 Jul. 3, 2008

Related U.S. Application Data

(62) Division of application No. 10/924,215, filed on Aug. 23, 2004, now Pat. No. 7,377,075.

(60) Provisional application No. 60/497,225, filed on Aug. 22, 2003.

(51) Int. Cl.
*E05F 15/00* (2006.01)
(52) U.S. Cl. ................................. 49/139; 49/341; 296/56
(58) Field of Classification Search .................... 49/139, 49/140, 339, 340, 341, 344; 296/146.4, 146.8, 296/56, 76, 106
See application file for complete search history.

(56) References Cited

U.S. PATENT DOCUMENTS

| | | | |
|---|---|---|---|
| 1,632,237 A | 6/1927 | Lemon | |
| 2,194,650 A | 3/1940 | Foster | |
| 3,344,556 A | 10/1967 | Edwards | |
| 3,468,061 A | 9/1969 | Ozaki | |
| 3,834,081 A | 9/1974 | Catlett | |
| 4,903,435 A | 2/1990 | Bittmann et al. | |
| 5,253,451 A | 10/1993 | Hormann | |
| 5,669,181 A | 9/1997 | Kollar et al. | |
| 5,906,071 A | 5/1999 | Buchanan, Jr. | |
| 6,108,976 A | 8/2000 | Kato et al. | |
| 6,112,462 A | 9/2000 | Kolar | |
| 6,234,563 B1 | 5/2001 | Bascou | |
| 6,367,864 B2 | 4/2002 | Rogers, Jr. et al. | |
| 6,398,288 B1 | 6/2002 | Yuge | |
| 6,557,301 B1 | 5/2003 | Hormann et al. | |
| 6,637,803 B2 | 10/2003 | Moreau | |
| 6,676,190 B2 | 1/2004 | Daniels et al. | |
| 2001/0033091 A1 | 10/2001 | Rogers, Jr. et al. | |
| 2002/0053169 A1 | 5/2002 | Menuzzo | |
| 2002/0157317 A1 | 10/2002 | Valencia et al. | |
| 2003/0005640 A1 | 1/2003 | Moreau | |
| 2003/0136054 A1* | 7/2003 | Daniels et al. ................... 49/340 |
| 2003/0208961 A1* | 11/2003 | Griffin et al. .................... 49/141 |

FOREIGN PATENT DOCUMENTS

| | | |
|---|---|---|
| CA | 2407642 | 11/2001 |
| EP | 1221523 A2 | 7/2002 |
| WO | WO 01/49961 | 7/2001 |

* cited by examiner

*Primary Examiner* — Jerry Redman

(57) ABSTRACT

A guide rail assembly for moving a closure panel of a motor vehicle between an open position and a closed position includes a guide rail fixedly secured to the motor vehicle. A slide mechanism slidably engages the guide rail. A rod has one end coupled to the slide mechanism and an opposing end coupled to the closure panel to move the closure panel as the slide mechanism slides along the guide rail. A drive is fixedly secured to the guide rail for selectively driving the slide mechanism along the guide rail. A clasp is operatively secured to the slide mechanism for selectively coupling the drive to the slide mechanism such that the drive moves the slide mechanism along the guide rail to move the closure panel between the open and closed positions when the slide mechanism is coupled with the drive.

21 Claims, 9 Drawing Sheets

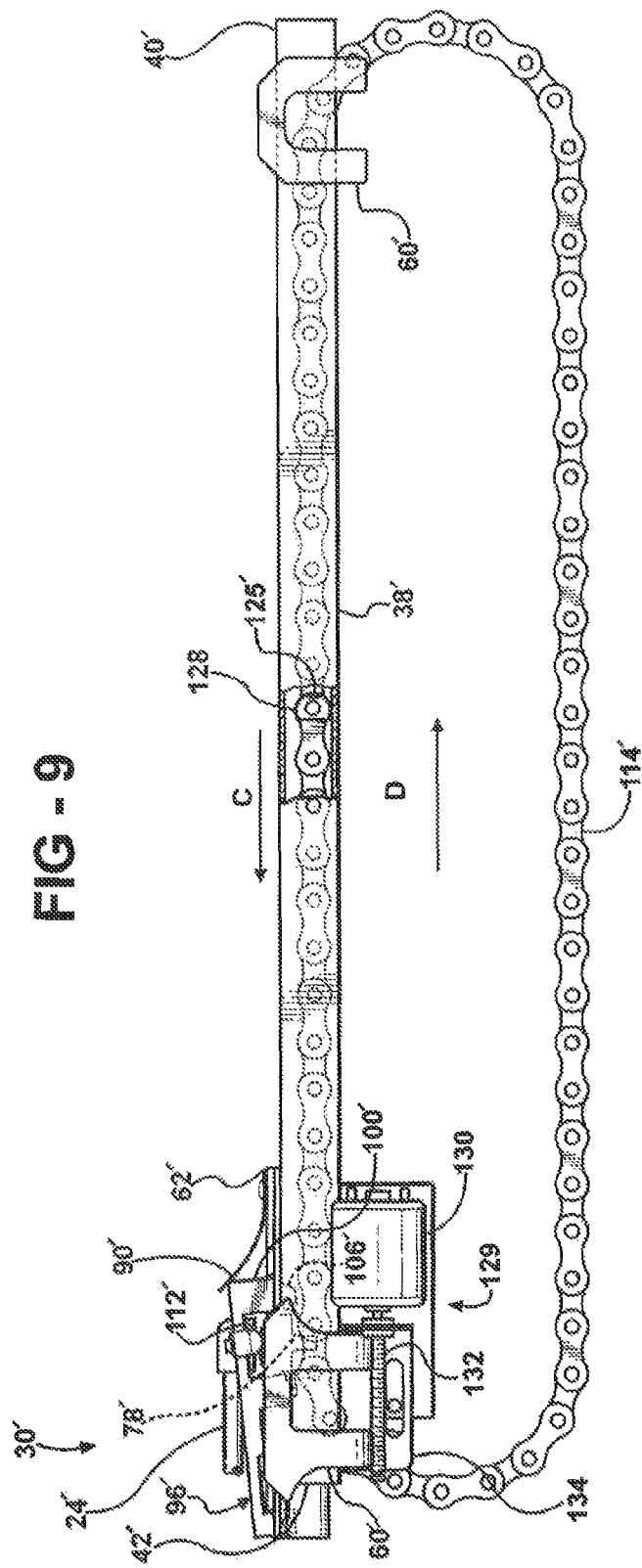

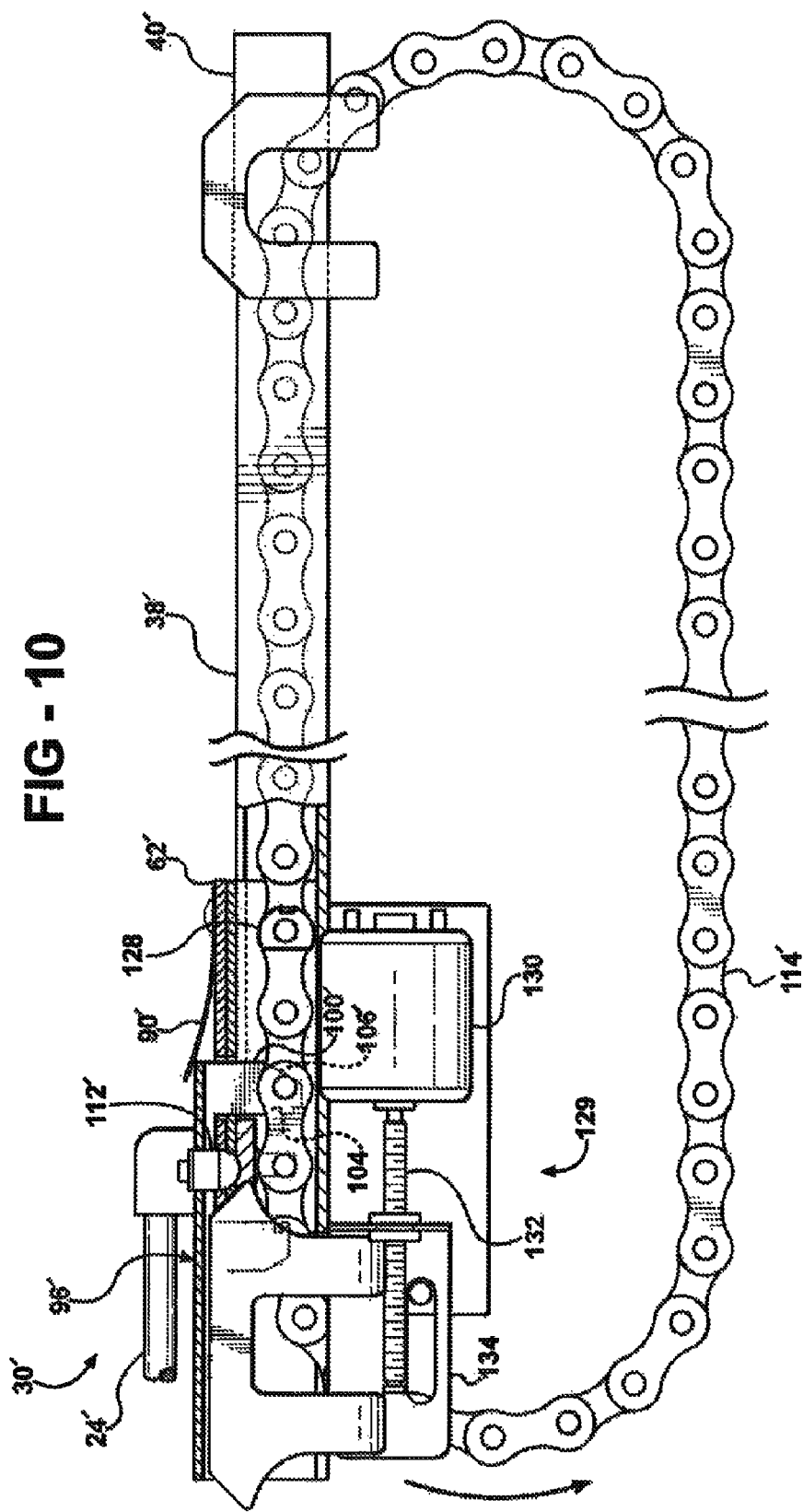

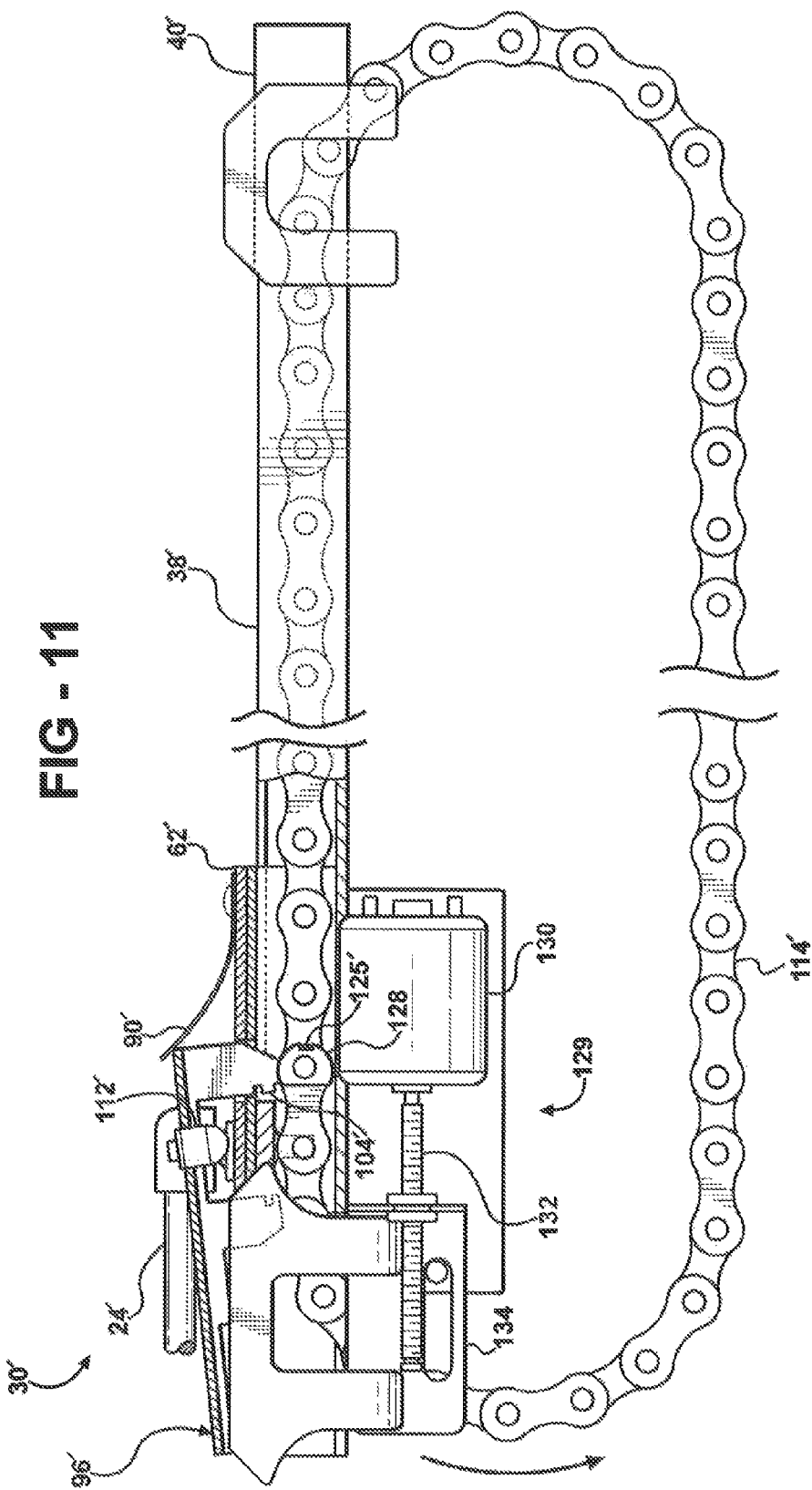

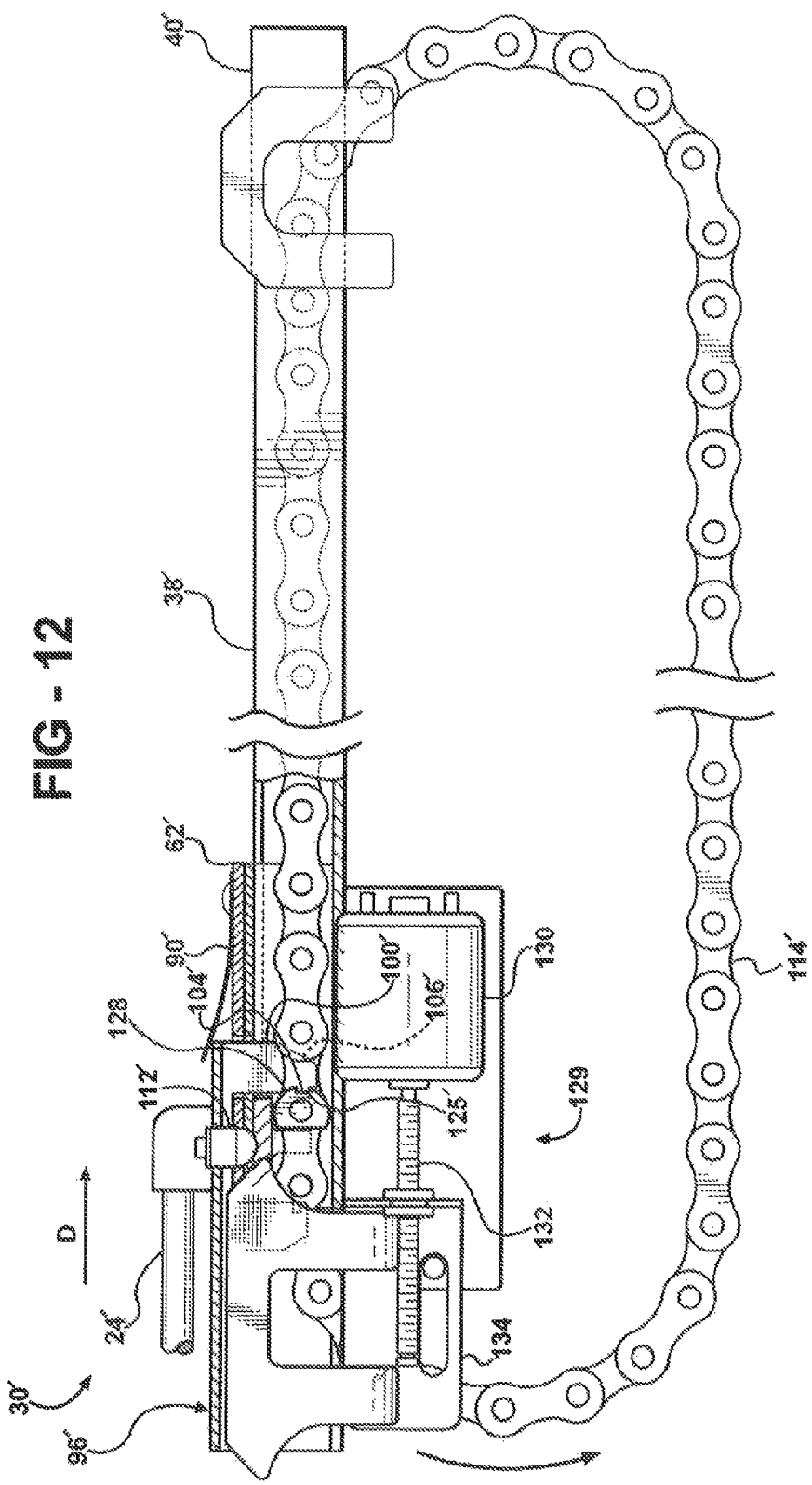

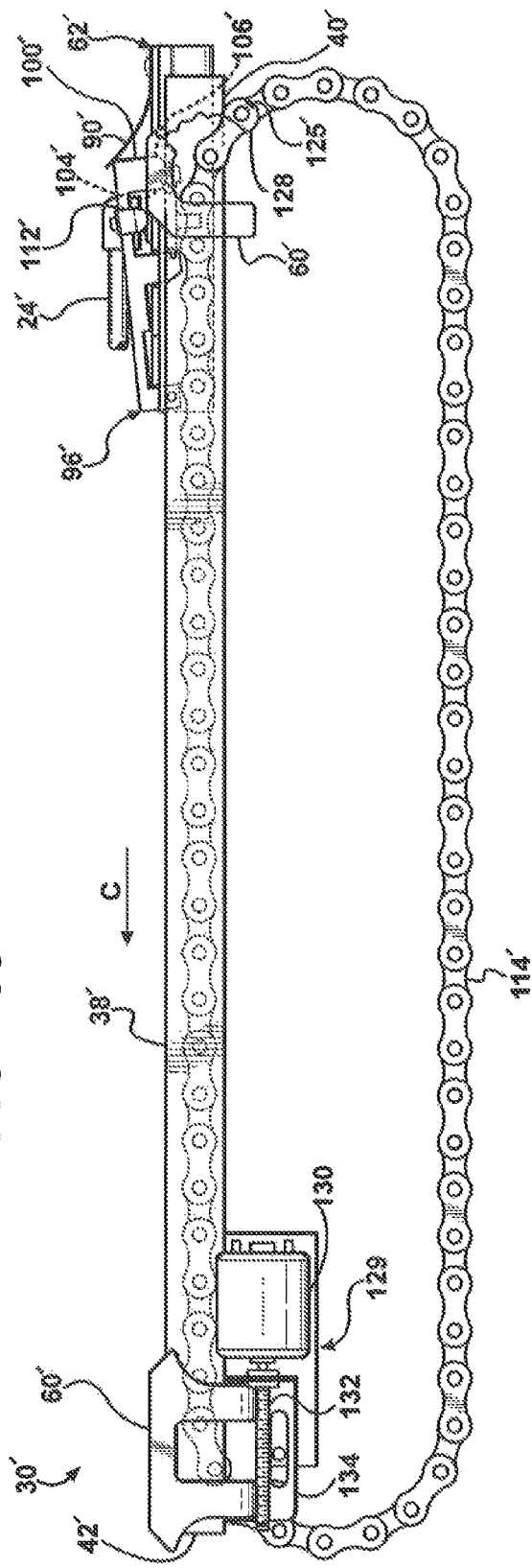

LINEAR MECHANISM FOR CLOSURE PANELS

CROSS-REFERENCE TO RELATED APPLICATION

This application is a divisional of U.S. patent application Ser. No. 10/924,215, filed on Aug. 23, 2004, entitled LINEAR MECHANISM FOR CLOSURE PANELS, now U.S. Pat. No. 7,377,075, which claims priority of U.S. Provisional Application Ser. No. 60/497,225, filed on Aug. 22, 2003.

FIELD OF THE INVENTION

The invention relates to motor vehicle closure panels. More particularly, the invention relates to a guide rail assembly for power operation of a motor vehicle closure panel between an open position and a closed position.

DESCRIPTION OF RELATED ART

Motor vehicles typically include closure panels, including liftgates, tailgates, and sliding doors, for selectively closing a motor vehicle opening. Many of these closure panels have, however, the disadvantage of being difficult to manually operate. Liftgates present particular problems for users. A liftgate is a large, heavy component that covers a large opening at the rear of a vehicle having a raised roof. Also, when the liftgate is fully open, the liftgate is at least partially disposed above the raised roof of the sport utility vehicle or minivan, which places the liftgate out of reach for many users. Power operated liftgates solve these problems by allowing the user to remotely open and close the liftgate without manual effort.

Numerous power operated liftgates are known to those of ordinary skill in the art. U.S. Pat. No. 6,367,864 to Rogers, Jr. et al. discloses a liftgate that is opened and closed by a power operating system including a pair of power units. Each power unit includes a fixed rectangular guide channel fixedly secured to a motor vehicle. A follower moves vertically in the guide channel. One end of a rod is secured to the follower and an opposing end of the rod is secured to the liftgate. The power unit also includes a first pulley and a second pulley. A drive chain wraps around part of the first pulley and part of the second pulley. The drive chain also extends into the open and closed ends of the guide channel, and opposite ends of the drive chain are attached to opposite ends of the follower. The drive loop is driven by a bi-directional drive unit including a reversible motor, and electromagnetic clutch, and a drive wheel. The drive wheel engages the drive chain to cause the follower to move along the guide channel for moving the liftgate between an open position and a closed position. The above-described liftgate is, however, rather large and occupies valuable space inside a compartment at the rear of the motor vehicle.

Therefore, there remains a need for a compact assembly for effecting power operation of a closure panel, such as a liftgate, between an open position and a closed position.

SUMMARY OF THE INVENTION

According to one aspect of the invention, a guide rail assembly for moving a closure panel of a motor vehicle between an open position and a closed position includes a guide rail fixedly secured to the motor vehicle. A slide mechanism slidably engages the guide rail. A rod has one end coupled to the slide mechanism and an opposing end coupled to the closure panel to move the closure panel as the slide mechanism slides along the guide rail. A drive is fixedly secured to the guide rail for selectively driving the slide mechanism along the guide rail. A clasp is operatively secured to the slide mechanism for selectively coupling the drive to the slide mechanism such that the drive moves the slide mechanism along the guide rail to move the closure panel between the open and closed positions when the slide mechanism is coupled with the drive.

BRIEF DESCRIPTION OF THE DRAWINGS

Advantages of the present invention will be readily appreciated as the same becomes better understood by reference to the following detailed description when considered in connection with the accompanying drawings wherein:

FIG. 9 is a side view of a guide rail assembly according to a second embodiment of the invention including a single drive lug and a ramp actuating assembly;

FIG. 10 is a side view, partially cut away, of the guide rail assembly including a ramp at a closed end of a guide rail in a non-use position;

FIG. 11 is a side view, partially cut away, of the guide rail assembly including the single drive lug lifting a first locking finger of a clasp;

FIG. 12 is a side view, partially cut away, of the guide rail assembly including the clasp in a lock position for coupling a slide mechanism to a chain; and FIG. 13 is a side view, partially cut away, of the guide rail assembly including the clasp in an unlock position at an open end of the guide rail.

DETAILED DESCRIPTION OF THE PREFERRED EMBODIMENT

Figure 2:
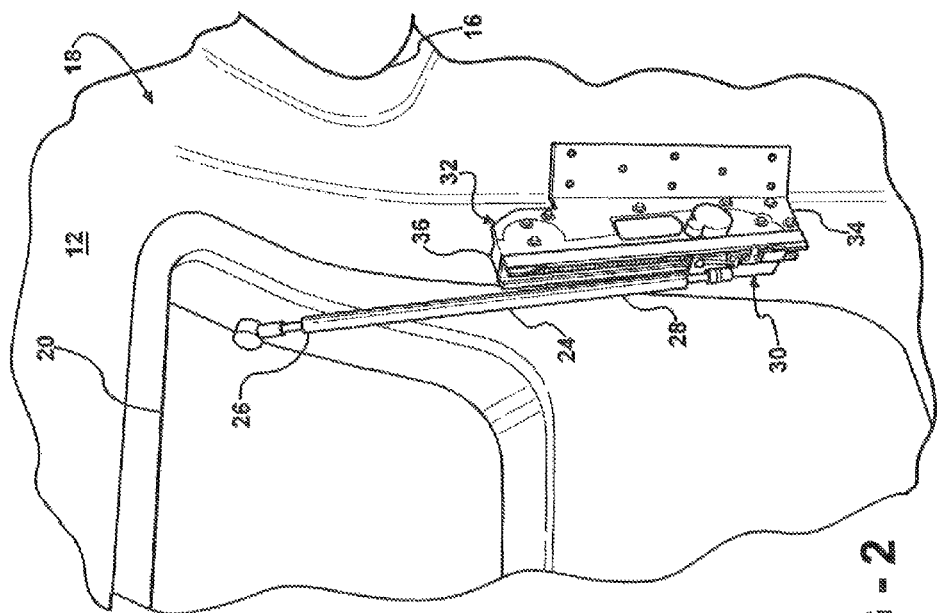
FIG. 2 is a fragmentary, perspective view of the compartment of the motor vehicle having the liftgate in a closed position.
Figure 1:
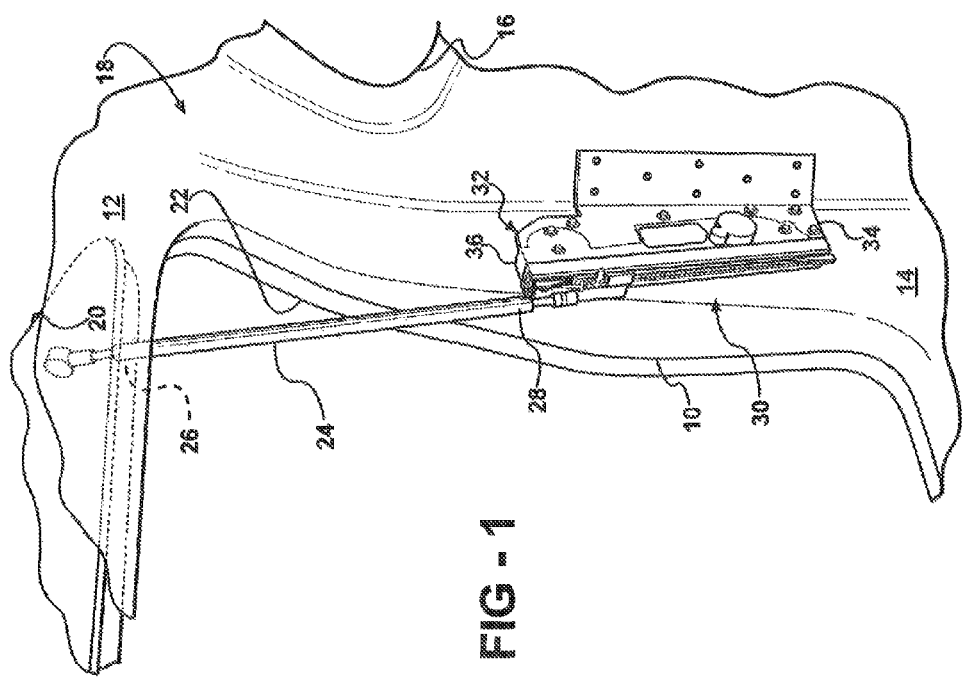
FIG. 1 is a fragmentary, perspective view of a compartment of a motor vehicle having a liftgate in an open position.

Referring to FIGS. 1 and 2, a motor vehicle 10 includes a roof 12, a floor 14, and a sidewall 16 extending therebetween. A compartment 18 of the motor vehicle 10 is defined by the roof 12, the floor 14, and the sidewall 16. A closure panel 20 is pivotally secured to the roof 12 for providing selective access to the compartment 18 through a rear opening 22. The closure panel 20 is movable between an open position, shown in FIG. 1, and a closed position, shown in FIG. 2. In a preferred embodiment of the invention, the closure panel 20 is a liftgate. A rod 24 includes a liftgate end 26 connected to the liftgate 20 and an opposing slide end 28.

A guide rail assembly, generally shown at 30, is fixedly secured to the sidewall 16 for automatically moving the liftgate 20 between the open and closed positions. The guide rail assembly 30 includes a housing, generally indicated at 32, having a pair of side plates 34 (one shown) and a cover 36. The housing 32 fixedly mounts the guide rail assembly 30 along the motor vehicle 10 and protects the internal components of the guide rail assembly 30 from contact with objects in the compartment 18.

Figure 3:
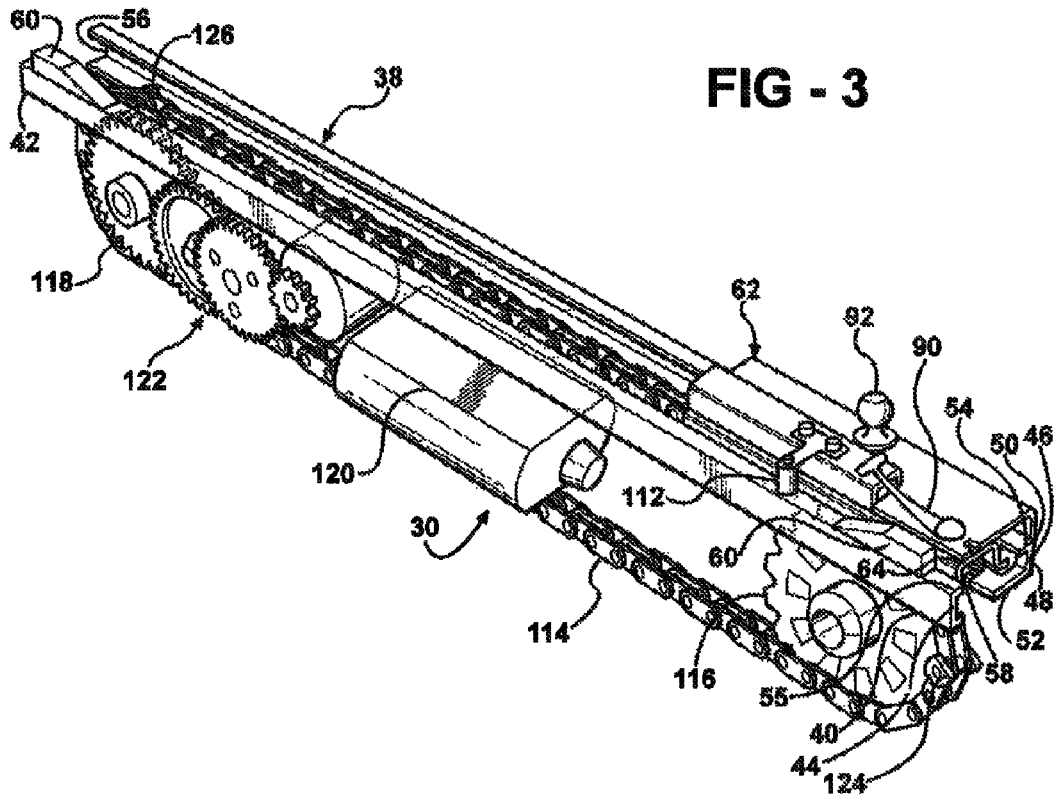
FIG. 3 is a perspective view of a guide rail assembly according to the invention.

Referring to FIG. 3, the guide rail assembly 30 includes a guide rail, generally shown at 38, extending between an open end 40 and an opposing closed end 42. The guide rail 38 includes parallel and spaced apart outer walls 44, 46 extending between the open 40 and closed 42 ends. Each outer wall 44, 46, includes a first end 48 and an opposing second end 50. A connecting wall 52 extends between the first ends 48 of the outer walls 44, 46. First 54 and second 55 tabs extend inwardly from the outer walls 44, 46 at the second end 50 thereof. The outer walls 44, 46, the connecting wall 52, and the tabs 54, 55 define a rail channel 56 extending between the open 40 and closed 42 ends of the guide rail 38. The guide rail 38 also includes an elongated slot 58 (one shown) formed in the connecting wall 52 at each of the open 40 and closed 42 ends. The guide rail 38 is preferably formed from metal.

The guide rail 38 further includes a ramp or inclined structure 60 fixedly secured thereto at each of the open 40 and closed 42 ends. More specifically, each ramp 60 is fixedly mounted along the second tab 55 outside of the rail channel 56. The ramps 60 are formed from a thermoplastic material.

Figure 4:
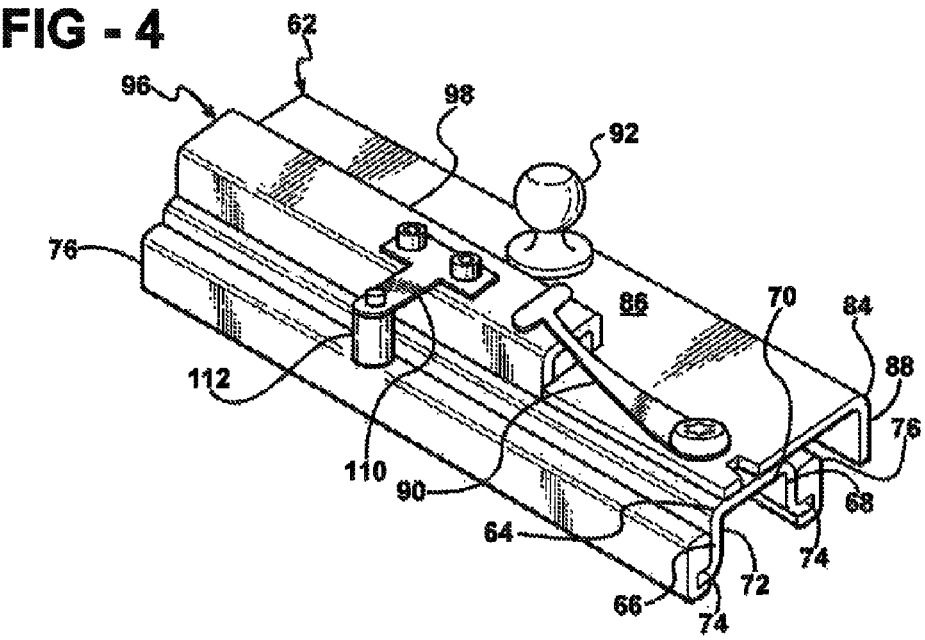
FIG. 4 is a perspective view of a slide mechanism of the guide rail assembly.

Referring to FIGS. 3 and 4, a slide mechanism, generally indicated at 62, slidably engages the guide rail 38 for movement between the open 40 and closed 42 ends thereof. The slide mechanism 62 includes a sliding bracket 64 disposed within the rail channel 56. The sliding bracket 64 includes opposing outer sides 66, 68 and a connecting side 70 extending therebetween. The sides 66, 68, 70 define a slide channel 72. Each of the outer sides 66, 68 terminates at an outwardly extending end portion 74, which slidably engages the guide rail 38 to move the slide mechanism 62 therealong. Each end portion 74 includes a glide 76, which is formed from polyurethane or a similar material, fixedly secured thereto for providing smooth, sliding engagement of the slide mechanism 62 along the guide rail 38.

Figure 5:
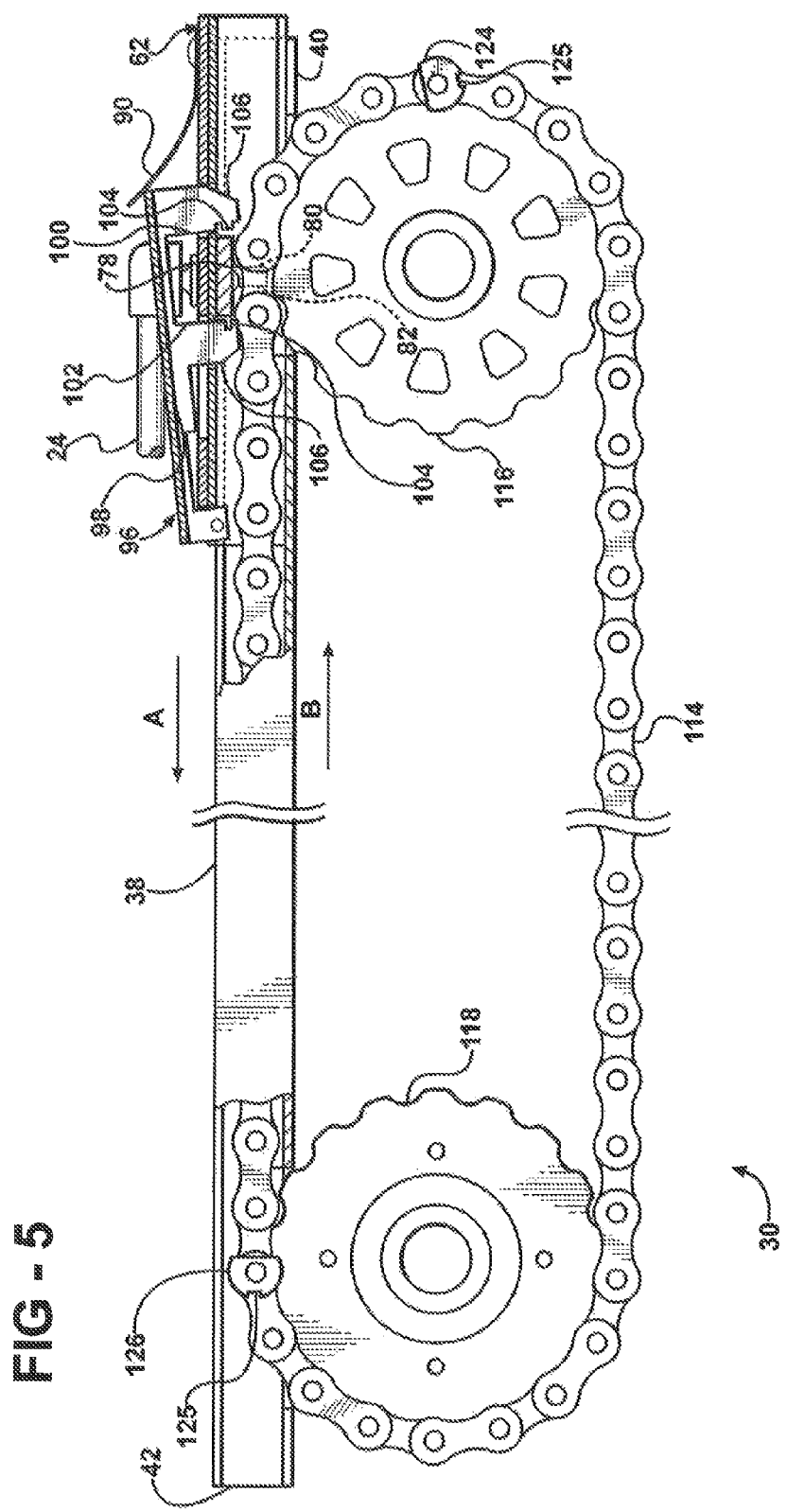
FIG. 5 is a side view, partially cut away, of the guide rail assembly including a clasp in an unlock position at an open end of a guide rail.

The sliding bracket 64 also includes a central engagement bracket 78, shown in FIG. 5, fixedly secured to the connecting side 70 and extending into the slide channel 72. The central engagement bracket 78 includes opposing first 80 and second 82 engagement surfaces.

Referring to FIG. 4, the slide mechanism 62 further includes an outer plate 84 fixedly secured to the sliding bracket 64 along the connecting side 70 thereof. The outer plate 84 is generally L-shaped and includes a first segment 86 and a second segment 88, generally perpendicular to the first segment 86. A spring 90 is mounted along the first segment 86. In the preferred embodiment, the spring 90 is a leaf spring. The first segment 86 also includes a rod connector 92 for connecting to the slide end 28 of the rod 24, which is secured to the liftgate 20. As a result, movement of the slide mechanism 62 between the open 40 and closed 42 ends of the guide rail 38 moves the liftgate 20 between the respective open and closed positions.

Referring to FIGS. 4 and 5, a clasp, generally indicated at 96, is pivotally hinged to the slide mechanism 62. The clasp 96 includes a body portion 98, and first 100 and second 102 locking fingers extending out from the body portion 98. Each of the first 100 and second 102 locking fingers includes a lock tab 104 and a ramped surface 106. The clasp 96 pivots between an unlock position, shown in FIGS. 5 and 6, and a lock position, shown in FIG. 7. In the unlock position, the first locking finger 100 is pivoted away from the central engagement bracket 78. And in the lock position, the first locking finger 100 closes around the central engagement bracket 78. The clasp 96 is biased into the lock position by the leaf spring 90.

Referring again to FIG. 4, the clasp, generally indicated at 96, includes an arm 110 resiliently coupled to the body portion 98 and extending out therefrom. The arm 110 includes a projection 112. When the slide mechanism 62 is at either of the open 40 and closed 42 ends of the guide rail 38, the projection 112 slidingly engages one of the ramps 60 to move the clasp 96 from the lock position to the unlock position such that the first locking finger 100 is pivoted away from the central engagement bracket 78.

Referring back to FIG. 3, a drive 114 is partially disposed within the rail channel 56 of the guide rail 38 for selectively driving the slide mechanism 62 between the open 40 and closed 42 ends of the guide rail 38 in order to move the liftgate 20 between its respective open and closed positions. In the preferred embodiment, the drive 114 is a flexible chain that is formed in a continuous loop. A portion of the chain 114 enters the rail channel 56 at the open end 40 and exits the rail channel 56 and the closed end 42. Although the drive 114 is a chain in the preferred embodiment, it should be appreciated that the drive 114 may be a belt, tape, cable, or lead screw.

An idler sprocket 116 and a drive sprocket 118 protrude through the slots 58 in the guide rail 38 at the open 40 and closed 42 ends thereof. The chain 114 wraps around a portion of each of the idler 116 and drive 118 sprockets. The drive sprocket 118 drives the chain 114 in one direction to move the liftgate 20 to the open position, and in an opposite direction to move the liftgate 20 to the closed position. A reversible motor 120 drives the drive sprocket 118 in both directions via a gear assembly, generally shown at 122.

Referring to FIG. 5, the chain 114 includes spaced apart first 124 and second 126 drive lugs fixedly secured thereto. The first 124 and second 126 drive lugs engage the respective first 80 and second 82 engagement surfaces of the central engagement bracket 78 as the chain 114 is driven by the motor 120. Each of the first 124 and second 126 drive lugs includes a recess 125 that is engaged by the lock tab 104 of the respective first 100 and second 102 locking fingers to interlock the chain 114 to the clasp 96. The first 124 and second 126 drive lugs define a lost motion coupling distance along the chain 114.

When the chain 114 is driven in the direction of arrow A in FIG. 5, the first drive lug 124 engages the first engagement surface 80 of the central engagement bracket 78 to move the slide mechanism 62 towards the closed end 42 of the guide rail 38, which at the same time moves the liftgate 20 to the closed position. The lock tab 104 of the first locking finger 100 locks inside the recess 125 of the first drive lug 124 to couple the chain 114 to the slide mechanism 62. The engagement of the lock tab 104 to the recess 125 restrains liftgate motion. When the chain 114 is driven in the opposite direction of arrow B in FIG. 5, the second drive lug 126 engages the second engagement surface 82 of the central engagement bracket 78 to move the slide mechanism 62 towards the open end 40 of the guide rail 38, which moves the liftgate 20 to the open position. The lock tab 104 of the second locking finger 102 locks inside the recess 125 of the second drive lug 126 to couple the chain 114 to the slide mechanism 62. The engagement of the lock tab 104 to the recess 125 restrains liftgate motion.

After the liftgate 20 reaches either of the open and closed positions, the locking finger 100, 102 is raised away from the respective drive lug 124, 126 such that the chain 114 is decoupled from the slide mechanism 62. The chain 114 is then able to move to a park position. When the chain 114 is in the park position, a user may manually move the liftgate 20 between the open and closed positions.

Figure 6:
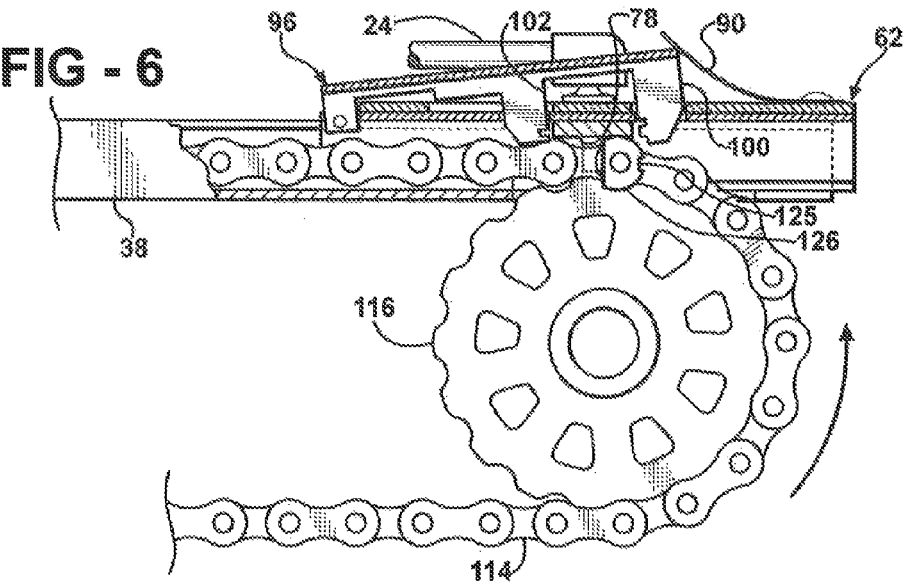
FIG. 6 is a side view, cut away, of a drive lug engaging a slide mechanism at the open end of the guide rail.
Figure 7:
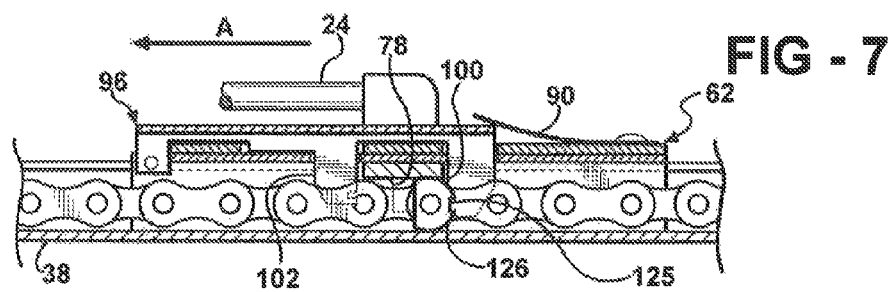
FIG. 7 is a side view, cut away, of the clasp in the lock position for coupling the slide mechanism to a chain.
Figure 8:
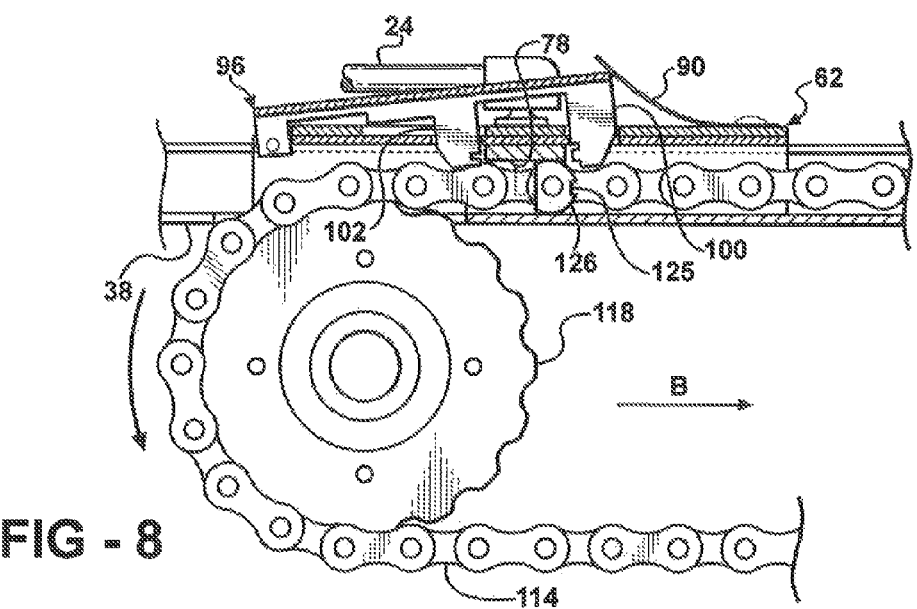
FIG. 8 is a side view, cut away, of the clasp in the unlock position at a closed end of the guide rail.

In operation, starting with the liftgate 20 in the open position, the slide mechanism 62 at the open end 40 of the guide rail 38, and the chain 114 in the park position, the motor 120 is activated to drive the chain 114 in the direction of arrow A, shown in FIG. 5. As a result, the first drive lug 124 is driven into engagement with the slide mechanism 62, as shown in FIG. 6. More specifically, the first engagement surface 80 of the central engagement bracket 78 is abutted by the first drive lug 124. The first drive lug 124 thus drives the slide mechanism 62 towards the closed end 42 of the guide rail 38. As the slide mechanism 62 initially moves towards the closed end 42 of the guide rail 38, the projection 112 travels down the ramp 60 at the open end 40 of the guide rail 38 and the spring 90 biases the clasp 96 into the lock position. The lock tab 104 of the first locking finger 100 locks into the recess 125 of the first drive lug 124, as shown in FIG. 7, to couple the slide mechanism 62 to the chain 114. As the coupled first drive lug 124 and slide mechanism 62 approach the closed end 42 of the guide rail 38, the projection 112 slidingly engages the ramp 60 at the closed end 42 of the guide rail 38 to move the clasp 96 into the unlock position, as shown in FIG. 8. As a result, the lock tab 104 of the first locking finger 100 is disengaged from the recess 125 and the chain 114 and slide mechanism 62 are effectively decoupled. The first drive lug 124 continues, however, to drive the slide mechanism 62 to the closed end 42 of the guide rail 38 to move the liftgate 20 to the closed position. Upon secondary latch confirmation, the motor 120 reverses to drive the chain 114 in the direction of arrow B to the park position. The path of the first drive lug 124 in the direction of arrow B is unimpeded due to the lifting of the first locking finger 100 when the clasp 96 is moved to the unlock position. When the chain 114 is in the park position, a user may manually open the liftgate 20.

To automatically move the liftgate 20 from the closed position to the open position, the motor 120 is activated to drive the chain 114 in the direction of arrow B, shown in FIG. 8. As a result, the second drive lug 126 is driven into engagement with the slide mechanism 62. More specifically, the second engagement surface 82 of the central engagement bracket 78 is abutted by the second drive lug 126. The second drive lug 126 thus drives the slide mechanism 62 towards the open end 40 of the guide rail 38. As the slide mechanism 62 initially moves towards the open end 40 of the guide rail 38, the projection 112 travels down the ramp 60 at the closed end 42 of the guide rail 38 and the spring 90 biases the clasp 96 into the lock position. The lock tab 104 of the second locking finger 102 locks into the recess 125 of the second drive lug 126 to couple the slide mechanism 62 to the chain 114. As the coupled second drive lug 126 and slide mechanism 62 approach the open end 40 of the guide rail 38, the projection 112 slidingly engages the ramp 60 at the open end 40 of the guide rail 38 to move the clasp 96 into the unlock position. As a result, the lock tab 104 of the second locking finger 102 is disengaged from the recess 125 and the chain 114 and slide mechanism 62 are effectively decoupled. The second drive lug 126 continues, however, to drive the slide mechanism 62 to the open end 40 of the guide rail 38 to move the liftgate 20 to the open position. The motor 120 then reverses to drive the chain 114 in the direction of arrow A to the park position. The path of the second drive lug 126 in the direction of arrow A is unimpeded due to the lifting of the second locking finger 102 when the clasp 96 is moved to the unlock position. When the chain 114 is in the park position, the user may manually close the liftgate 24.

Referring to FIGS. 9 through 13, wherein like primed reference numerals represent similar elements as those described above, the guide rail assembly 30' according to a second embodiment includes a single drive lug 128 fixedly secured to the chain 114' for driving the slide mechanism 62' along the guide rail 38' between the open 40' and closed 42' ends thereof in order to move the liftgate 20' between the respective open and closed positions. The chain 114' including the single drive lug 128 has two park positions: a middle park position, shown in FIG. 9, and an end park position, shown in FIG. 13. When the liftgate 20' is closed, the single drive lug 128 moves to the middle park position at approximately the midpoint between the open 40' and closed 42' ends of the guide rail 38'. When the liftgate 20' is open, the single drive lug 128 is in the end park position adjacent the open end 40' of the guide rail 38'.

The middle park position for the single drive lug 128 provides two distinct benefits. First, parking the single drive lug 128 between the open 40' and closed 42' ends of the guide rail 38', rather than adjacent the open end 40' of the guide rail 38', improves the response time for reaching the slide mechanism 62' at the closed end 42' of the guide rail 38' for power opening of the liftgate 20'. Second, in the event of a power failure in the liftgate 20', the single drive lug 128 can be easily back-driven to the open end 40' of the guide rail 38' to move the liftgate 20' into the open position.

A ramp actuating assembly, generally shown at 129, includes a reversible ramp motor 130 operably connected to the ramp 60' at the closed end 42' of the guide rail 38'. The ramp 60' at the closed end 42' is thus movable between a use position, shown in FIG. 9, and a non-use position, shown in FIG. 10. A lead screw 132 is axially driven by the ramp motor 130. A base 134 of the ramp 60' at the closed end 42' is fixedly mounted to the lead screw 132. As a result, activation of the ramp motor 130 in one direction axially drives the lead screw 132 to move the ramp 60' at the closed end 42' to the non-use position, and activation of the ramp motor 130 in an opposite direction axially drives the lead screw 132 to move the ramp 60' at the closed end 42' back to the use position.

In operation, starting with the liftgate 20' in the closed position, the single drive lug 128 in the middle park position, and the slide mechanism 62' disposed at the closed end 42' of the guide rail 38' (as shown in FIG. 9), the motor 120' is activated to drive the chain 114' in the direction of arrow C. At the same time, the ramp motor 130 is activated to move the ramp 60' at the closed end 42' from the use position, shown in FIG. 9, to the non-use position, shown in FIGS. 10 through 12. As a result, the projection 112' slides down the ramp 60' at the closed end 42' so that the leaf spring 90' biases the clasp 96' into the lock position. More specifically, the first locking finger 100' of the clasp 96' is biased towards the central engagement bracket 78'. The single drive lug 128, which moves with the chain 114' in the direction of arrow C, abuts the ramped surface 106' of the first locking finger 100' to momentarily lift the first locking finger 100', as shown in FIGS. 10 and 11. The single drive lug 128 then moves past the first locking finger 100' and abuts the central engagement bracket 78'. The first locking finger 100' closes around the single drive lug 128 such that the lock tab 104' locks into the recess 125' of the single drive lug 128'. As a result, the slide mechanism 62' and the chain 114' are coupled to one another. The motor 120' then reverses to move the chain 114' towards the open end 40' of the guide rail 38' in the direction of arrow D, as shown in FIG. 12. Meanwhile, the ramp motor 130 moves the ramp 60' at the closed end 42' of the guide rail 38' back to the use position. As the coupled slide mechanism 62' and chain 114' approach the open end 40' of the guide rail 38', the projection 112' slidably engages the ramp 60' at the open end 40' of the guide rail 38' to lift the clasp 96' into the unlock position, as shown in FIG. 13, to effectively decouple the slide mechanism 62' from the chain 114'. The single drive lug 128 continues, however, to move the slide mechanism 62' to the open end 40' of the guide rail 38' to move the liftgate 20' into the open position. The chain 114' then parks in the end park position. At this time, manual closing of the liftgate 20' will move the slide mechanism 62' towards the closed end 42' of the guide rail 38' while the chain 114' remains stationary, that is, the single drive lug 128 remains in the end park position.

To automatically move the liftgate 20' from the open position back to the closed position, the motor 120' is activated to drive the chain 114' out of the end park position in the direction of arrow C, shown in FIG. 13. As a result, the single drive lug 128 is driven into engagement with the slide mechanism 62'. More specifically, the central engagement bracket 78' is abutted by the single drive lug 128. The single drive lug 128 thus drives the slide mechanism 62' towards the closed end 42' of the guide rail 38'. As the slide mechanism 62' initially moves towards the closed end 42' of the guide rail 38', the projection 112' travels down the ramp 60' at the open end 40' of the guide rail 38' and the leaf spring 90' biases the clasp 96' into the lock position. The lock tab 104' of the first locking finger 100' locks into the recess 125' of the single drive lug 128 to couple the slide mechanism 62' to the chain 114'. As the coupled single drive lug 128 and slide mechanism 62' approach the closed end 42' of the guide rail 38', the projection 112' slidingly engages the ramp 60' at the closed end 42' of the guide rail 38', which is in the use position, to move the clasp 96' into the unlock position. As a result, the lock tab 104' of the first locking finger 100' is disengaged from the recess 125' and the chain 114' and slide mechanism 62' are effectively decoupled. The single drive lug 128 continues, however, to drive the slide mechanism 62' to the closed end 42' of the guide rail 38' to move the liftgate 20' to the closed position. Upon secondary latch conformation, the motor 120' reverses to drive the chain 114' in the direction of arrow D to the middle park position, shown in FIG. 9. The path of the single drive lug 128 in the direction of arrow D is unimpeded due to the lifting of the first locking finger 100' as the clasp 96' moved to the unlock position. When the chain 114' is in the middle park position, the user may manually open the liftgate 20'.

In each of the above-described first and second embodiments, a chime alert, which is utilized for warning individuals the liftgate 20, 20' that the liftgate 20, 20' is about to open or close and is well-known to those skilled in the art, masks the sound of the chain 114, 114' moving out of its park position and into engagement with the slide mechanism 62, 62'.

Finally, although the above-described first and second embodiments have been directed to a liftgate, it is hereby appreciated that the guide rail assembly according to the invention may be utilized to automatically move any of numerous closure panels including, but not limited to, decklids, hatchback gates, tonneau covers, sliding doors, and hinged doors.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A guide rail assembly for moving a closure panel of a motor vehicle between an open position and a closed position, said guide rail assembly comprising:
   a guide rail fixedly secured to the motor vehicle;
   a slide mechanism slidably engaging said guide rail;
   a rod having one end coupled to said slide mechanism and an opposing end adapted to be coupled to the closure panel to move the closure panel as said slide mechanism moves along said guide rail;
   a drive coupled to said guide rail and having a single drive lug fixedly mounted thereto, said single drive lug selectively engaging said slide mechanism for moving said slide mechanism bi-directionally along said guide rail; and
   a clasp operatively secured to said slide mechanism for selectively coupling said drive to said slide mechanism, said clasp lockingly engageable with said single drive lug for coupling said slide mechanism to said drive and disengageable with said single drive lug for decoupling said slide mechanism from said drive at the end of travel of said slide mechanism.

2. A guide rail assembly as set forth in claim 1 wherein said clasp includes a locking finger for locking said slide mechanism into coupling engagement with said drive.

3. A guide rail assembly as set forth in claim 2 wherein said locking finger includes a locking tab.

4. A guide rail assembly as set forth in claim 3 wherein said single drive lug includes a recess for selectively receiving said locking tab of said locking finger to lock said clasp to said single drive lug.

5. A guide rail assembly as set forth in claim 1 including a ramp disposed along said guide rail for moving said clasp out of engagement with said single drive lug to decouple said slide mechanism from said drive.

6. A guide rail assembly as set forth in claim 5 including a lead screw fixedly secured to said ramp for moving said ramp between a use position and a non-use position.

7. A guide rail assembly as set forth in claim 6 including a ramp motor operably coupled to said lead screw for axially driving said lead screw in opposing first and second directions to move said ramp between said use and non-use positions.

8. A guide rail assembly for moving a closure panel of a motor vehicle between an open position and a closed position, said guide rail assembly comprising:
   a guide rail fixedly secured to the motor vehicle;
   a drive having a single drive lug fixedly mounted thereto, said single drive lug movable in opposing first and second directions relative to said guide rail; and
   a slide mechanism slidably engaging said guide rail and adapted to be coupled to the closure panel, said slide mechanism coupled to said single drive lug to move the closure panel between the open and closed positions as said single drive lug moves in said opposing first and second directions, and said slide mechanism uncoupled from said single drive lug when the closure panel completes travel to either the open or closed positions.

9. A guide rail assembly as set forth in claim 8 including a clasp operatively secured to said slide mechanism, said clasp lockingly engageable with said single drive lug for coupling said slide mechanism to said drive and disengageable with said single drive lug for decoupling said slide mechanism from said drive at the end of travel of said slide mechanism.

10. A guide rail assembly as set forth in claim 9 including a ramp disposed along said guide rail for moving said clasp out of engagement with said single drive lug to decouple said slide mechanism from said drive.

11. A guide rail assembly as set forth in claim 10 wherein said slide mechanism includes a central engagement bracket positioned for engagement by said single drive lug to drive said slide mechanism along said guide rail.

12. A guide rail assembly as set forth in claim 11 including a rod having one end coupled to said slide mechanism and an opposing end adapted to be coupled to the closure panel to move the closure panel as said slide mechanism moves along said guide rail.

13. A guide rail assembly as set forth in claim 8 wherein said single drive lug moves to a middle park position between an open end and a closed end of said guide rail when the closure panel completes travel to the closed position and said slide mechanism is uncoupled from said single drive lug.

14. A guide rail assembly as set forth in claim 8 wherein said single drive lug moves to an end park position adjacent said open end of said guide rail when the closure panel completes travel to the open position and said slide mechanism is uncoupled from said single drive lug.

15. A guide rail assembly for moving a closure panel of a motor vehicle between an open position and a closed position, said guide rail assembly comprising:
   a guide rail fixedly secured to the motor vehicle;
   a drive having a single drive lug movable in opposing first and second directions relative to said guide rail;
   a slide mechanism slidably engaging said guide rail and adapted to be coupled to the closure panel, said slide mechanism coupled to said single drive lug to move the closure panel between the open and closed positions as said single drive lug moves in said opposing first and second directions, and said slide mechanism uncoupled from said single drive lug when the closure panel completes travel to either the open or closed positions; and
   a clasp pivotally coupled directly to said slide mechanism, said clasp pivotal between a lock position, wherein said clasp is engaged with said single drive lug to couple said slide mechanism to said drive, and an unlock position, wherein said clasp is disengaged from said single drive lug to decouple said slide mechanism from said drive.

16. A guide rail assembly as set forth in claim 15 wherein said single drive lug includes a recess and said clasp includes a locking finger having a lock tab, said clasp pivoting between said lock position wherein said lock tab is engaged with said recess and said unlock position wherein said lock tab is disengaged with said recess.

17. A guide rail assembly as set forth in claim 15 including a ramp disposed along said guide rail for pivoting said clasp out of engagement with said single drive lug to decouple said slide mechanism from said drive.

18. A guide rail assembly as set forth in claim 17 including a lead screw fixedly secured to said ramp for moving said ramp between a use position and a non-use position.

19. A guide rail assembly as set forth in claim 18 including a ramp motor operably coupled to said lead screw for axially driving said lead screw in opposing first and second directions to move said ramp between said use and non-use positions.

20. A guide rail assembly as set forth in claim 15 wherein said slide mechanism includes a central engagement bracket positioned for engagement by said single drive lug to drive said slide mechanism along said guide rail.

21. A guide rail assembly as set forth in claim 20 wherein said clasp includes a locking finger having a ramped surface, said single drive lug abutting said ramped surface to pivot said clasp and lift said locking finger thereby allowing said single drive lug to move past said locking finger and abut said central engagement bracket

\* \* \* \* \*